(12) United States Patent
Yeh et al.

(10) Patent No.: US 11,402,992 B2
(45) Date of Patent: Aug. 2, 2022

(54) CONTROL METHOD, ELECTRONIC DEVICE AND NON-TRANSITORY COMPUTER READABLE RECORDING MEDIUM DEVICE

(71) Applicant: ASUSTeK COMPUTER INC., Taipei (TW)

(72) Inventors: Chun-Tsai Yeh, Taipei (TW); Hung-Yi Lin, Taipei (TW); Meng-Ju Lu, Taipei (TW); Chien-Chih Tseng, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/381,151

(22) Filed: Apr. 11, 2019

(65) Prior Publication Data
US 2020/0133475 A1 Apr. 30, 2020

(30) Foreign Application Priority Data
Oct. 29, 2018 (TW) .................................. 107138249

(51) Int. Cl.
*G06F 1/16* (2006.01)
*G06F 3/041* (2006.01)
(Continued)

(52) U.S. Cl.
CPC ........ *G06F 3/04883* (2013.01); *G06F 1/1647* (2013.01); *G06F 1/1662* (2013.01);
(Continued)

(58) Field of Classification Search
CPC ............. G06F 3/04886; G06F 3/04883; G06F 3/0488; G06F 3/0482; G06F 3/04845;
(Continued)

(56) References Cited

U.S. PATENT DOCUMENTS

| | | | |
|---|---|---|---|
| 8,650,508 B2* | 2/2014 | Lim ...................... | G06F 3/0485 345/157 |
| 9,009,984 B2* | 4/2015 | Caskey ............... | H04M 1/0247 33/355 R |

(Continued)

FOREIGN PATENT DOCUMENTS

| CN | 101930333 B | 10/2012 |
|---|---|---|
| CN | 103403647 A | 11/2013 |

(Continued)

*Primary Examiner* — Dismery Mercedes
(74) *Attorney, Agent, or Firm* — McClure, Qualey & Rodack, LLP (57) ABSTRACT

A control method applied to an electronic device with a first screen and a second screen is provided. The control method includes the following steps: receiving touch data responding to a touch behavior generated by the second screen; determining whether the touch behavior is a touchpad operation instruction or a touch screen operation instruction according to the touch data; triggering corresponding touchpad operation according to the touch data when the touch behavior is the touchpad operation instruction; and triggering corresponding touch screen operation according to the touch data when the touch behavior is the touch screen operation instruction.

13 Claims, 8 Drawing Sheets

(51) Int. Cl.
 *G06F 3/0488* (2022.01)
 *G06F 3/04883* (2022.01)
 *G06F 3/14* (2006.01)
 *G06F 3/04886* (2022.01)
 *G06F 3/0487* (2013.01)
 *G06F 3/045* (2006.01)
 *G06F 3/044* (2006.01)

(52) U.S. Cl.
 CPC ............ *G06F 1/1692* (2013.01); *G06F 3/041* (2013.01); *G06F 3/0487* (2013.01); *G06F 3/0488* (2013.01); *G06F 3/04886* (2013.01); *G06F 3/1423* (2013.01); *G06F 3/044* (2013.01); *G06F 3/045* (2013.01); *G06F 2203/04803* (2013.01)

(58) Field of Classification Search
 CPC .... G06F 3/0412; G06F 3/0485; G06F 3/0416; G06F 3/041; G06F 2203/04803; G06F 2203/04808; G06F 1/1647; G06F 3/0487; G06F 3/0481; G06F 1/1616; G06F 1/1641; G06F 1/1643; G06F 1/1692
 See application file for complete search history.

(56) References Cited

U.S. PATENT DOCUMENTS

| | | | | |
|---|---|---|---|---|
| 9,098,236 B2* | 8/2015 | Ishizuka | ............... | G06F 40/166 |
| 10,133,396 B2* | 11/2018 | Kumar | ................ | G06F 3/04883 |
| 10,725,506 B2* | 7/2020 | Iyer | .................... | G06F 3/04886 |
| 2004/0021681 A1* | 2/2004 | Liao | ...................... | G06F 1/1616 |
| | | | | 715/702 |
| 2005/0168399 A1* | 8/2005 | Palmquist | ............ | G06F 1/1601 |
| | | | | 345/1.1 |
| 2006/0071915 A1* | 4/2006 | Rehm | ..................... | G06F 1/169 |
| | | | | 345/173 |
| 2010/0265183 A1* | 10/2010 | Mail | ................... | G06F 3/04895 |
| | | | | 345/168 |
| 2010/0283747 A1* | 11/2010 | Kukulski | ................ | G06F 3/041 |
| | | | | 345/173 |
| 2011/0047459 A1* | 2/2011 | Van Der Westhuizen | ................... | |
| | | | | G06F 3/04883 |
| | | | | 345/173 |
| 2011/0072345 A1* | 3/2011 | Lim | ........................ | G06F 3/016 |
| | | | | 715/702 |
| 2011/0109567 A1* | 5/2011 | Kim | ..................... | G06F 1/1692 |
| | | | | 345/173 |
| 2011/0193806 A1* | 8/2011 | Kim | ...................... | G06F 1/1615 |
| | | | | 345/173 |
| 2011/0216064 A1* | 9/2011 | Dahl | ...................... | G06F 1/1616 |
| | | | | 345/428 |
| 2012/0038570 A1* | 2/2012 | Delaporte | ............. | G06F 1/1616 |
| | | | | 345/173 |
| 2012/0266098 A1* | 10/2012 | Webber | ................ | G06Q 10/107 |
| | | | | 715/778 |
| 2012/0278734 A1* | 11/2012 | Ishizuka | ............... | G06F 1/1624 |
| | | | | 715/752 |
| 2012/0306773 A1* | 12/2012 | Yeung | ................... | G06F 3/0486 |
| | | | | 345/173 |
| 2014/0047379 A1* | 2/2014 | Urawaki | .................. | G09G 5/14 |
| | | | | 715/789 |
| 2014/0118271 A1* | 5/2014 | Lee | ........................ | G06F 3/0488 |
| | | | | 345/173 |
| 2014/0143676 A1* | 5/2014 | Tan | ........................ | G06F 3/1423 |
| | | | | 715/744 |
| 2014/0191977 A1* | 7/2014 | Feng | ..................... | G06F 3/0412 |
| | | | | 345/173 |
| 2014/0310638 A1* | 10/2014 | Lee | ..................... | G06F 3/04886 |
| | | | | 715/773 |
| 2015/0169205 A1* | 6/2015 | Yajima | ................. | G06F 3/04847 |
| | | | | 715/799 |
| 2015/0220299 A1* | 8/2015 | Kim | ........................ | G06F 3/0488 |
| | | | | 345/1.3 |
| 2015/0317120 A1* | 11/2015 | Kim | ........................ | G06F 3/1446 |
| | | | | 345/1.3 |
| 2015/0324162 A1* | 11/2015 | Kim | ........................ | G06F 3/013 |
| | | | | 345/169 |
| 2016/0313962 A1* | 10/2016 | Kwon | .................... | G06F 3/0488 |
| 2016/0349989 A1* | 12/2016 | Yu | ............................ | G06F 3/041 |
| 2017/0052698 A1 | 2/2017 | Seo et al. | | |
| 2017/0255320 A1* | 9/2017 | Kumar | ................... | G06F 1/1616 |
| 2018/0107303 A1* | 4/2018 | Park | ....................... | H01H 13/66 |
| 2019/0012008 A1* | 1/2019 | Yoon | .................... | G06F 1/1652 |
| 2019/0205029 A1* | 7/2019 | Zhu | ...................... | G06F 1/1647 |
| 2019/0250666 A1* | 8/2019 | Klein | .................... | G06F 3/0393 |
| 2019/0278393 A1* | 9/2019 | Lee | ........................ | G06F 3/0488 |
| 2020/0064892 A1* | 2/2020 | Iyer | ....................... | G06F 3/0487 |

FOREIGN PATENT DOCUMENTS

| | | |
|---|---|---|
| CN | 103261995 B | 4/2017 |
| CN | 107741760 A | 2/2018 |
| TW | 201248490 A | 12/2012 |
| WO | 2012044775 A1 | 4/2012 |
| WO | 2012044801 A1 | 4/2012 |

* cited by examiner

CONTROL METHOD, ELECTRONIC DEVICE AND NON-TRANSITORY COMPUTER READABLE RECORDING MEDIUM DEVICE

CROSS-REFERENCE TO RELATED APPLICATION

This application claims the priority benefit of Taiwan Application Serial No. 107138249, filed on Oct. 29, 2018. The entirety of the above-mentioned patent application is hereby incorporated by reference herein and made a part of the specification.

BACKGROUND OF THE INVENTION

Field of the Invention

The invention relates to a control method, an electronic device and a non-transitory computer readable recording medium device.

Description of the Related Art

In recent years, dual-screen system is gradually applied to various electronic devices due to provide better user experiences. For an instance, one of the screens is conducted as an extension screen of a main screen in a notebook computer with a dual-screen output system. However, it is incapable of providing multiple application modes for the user to apply to different situations currently. In addition, in the notebook computer with the conventional dual-screen output system, effective interaction is not realized between the two screens, resulting in tedious transmission procedure and low touch-responsive efficiency, which decreases the overall performance.

BRIEF SUMMARY OF THE INVENTION

According to the first aspect of the disclosure, a control method applied to an electronic device with a first screen and a second screen is provided herein. The control method includes: receiving touch data responding to a touch behavior generated by the second screen; determining whether the touch behavior is a touchpad operation instruction or a touch screen operation instruction according to the touch data; triggering corresponding touchpad operation according to the touch data when the touch behavior is the touchpad operation instruction; and triggering corresponding touch screen operation according to the touch data when the touch behavior is the touch screen operation instruction.

According to the second aspect, an electronic device is provided herein. The electronic device includes: a first screen, configured to display a first image; a second screen, configured to generate touch data responding to a touch behavior; and a processor, configured to receive the touch data, and determine whether the touch behavior is a touchpad operation instruction or a touch screen operation instruction according to the touch data; wherein the processor triggers corresponding touchpad operation according to the touch data when the touch behavior is the touchpad operation instruction, and the processor triggers corresponding touch screen operation according to the touch data when the touch behavior is the touch screen operation instruction.

According to the third aspect of the disclosure, a non-transitory computer readable storage medium is provided herein. The computer readable recording medium device stores a program command. After the program command is loaded on an electronic device with a first screen and a second screen, the electronic device performs steps of: receiving touch data responding to a touch behavior generated by the second screen; determining whether the touch behavior is a touchpad operation instruction or a touch screen operation instruction according to the touch data; triggering corresponding touchpad operation according to the touch data when the touch behavior is the touchpad operation instruction; and triggering corresponding touch screen operation according to the touch data when the touch behavior is the touch screen operation instruction.

The detailed descriptions of other effects and embodiments of the invention are provided below with reference to the accompanying drawings.

BRIEF DESCRIPTION OF THE DRAWINGS

To more clearly describe the technical solutions in the embodiments of this application or in the prior art, the following will briefly introduce the drawings required for describing the embodiments or the prior art. It is apparent that the drawings in the following description are only some embodiments described in this application, and a person of ordinary skill in the art may obtain other drawings on the basis of these drawings without any creative effort.

DETAILED DESCRIPTION OF THE EMBODIMENTS

Referring to FIG. 1 to FIG. 8, the control method of any embodiment of the invention is implemented in an electronic device 100. In one embodiment, the electronic device 100 determines whether a touch behavior of a user is a touchpad operation instruction or a touch screen operation instruction to trigger corresponding touchpad operation or touch screen operation. The electronic device 100 includes a first machine body 101, a second machine body 102 and a processor 130, wherein the first machine body 101 includes a first screen 110, and the second machine body 102 includes a second screen 120. The first machine body 101 and the second machine body 102 are connected with each other by a hinge. The processor 130 is coupled to the first screen 110 and the second screen 120. In some embodiments, the processor 130 is integrated in the first machine body 101 or the second machine body 102. In this embodiment, the processor 130 is integrated in the first machine body 101, but the disclosure is not limited thereto.

Figure 1:
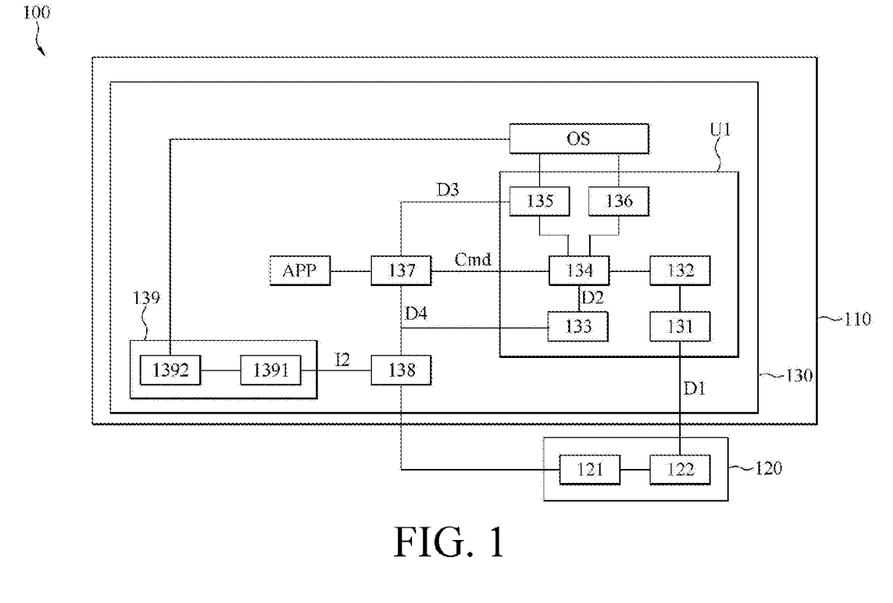
FIG. 1 is a block general schematic diagram of an embodiment of an electronic device.

In an embodiment, the first screen 110 is a display screen and the second screen 120 is a touch display screen, and the user performs various touch behaviors via the second screen 120, but the disclosure is not limited thereto. In other embodiment, and both the first screen 110 and the second screen 120 are touch display screens, so that the user performs various touch behaviors via the first screen 110 and the second screen 120.

Figure 4:
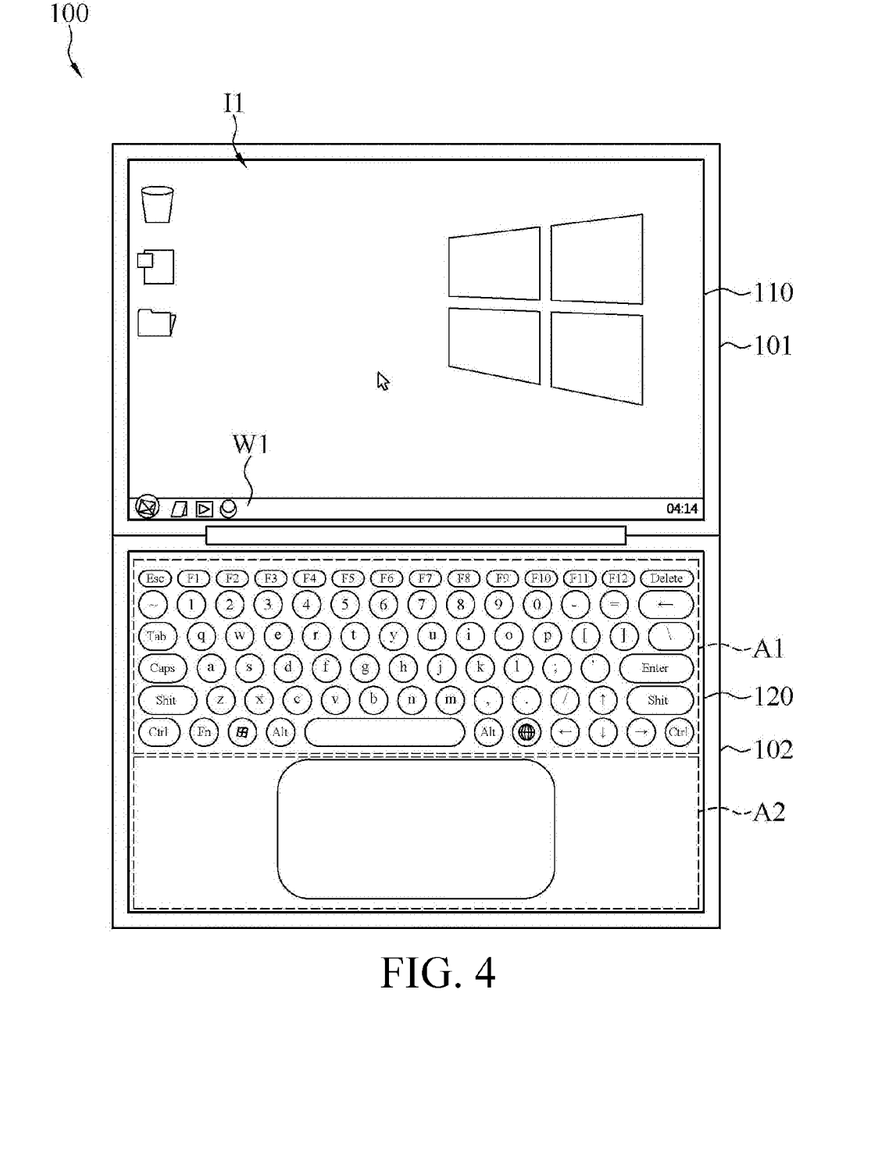
FIG. 4 is a general schematic diagram of an embodiment when the electronic device is operated in a general notebook computer mode.

In one embodiment, the first screen 110 displays a first image I1. The first image I1 displayed on the first screen 110 is a panorama picture, as shown in FIG. 4. In some embodiments, the first image I1 includes user interface and interface items such as desktop, folder, icons of application programs, system taskbar W1, imagination display in execution of application programs, imagination display of touch operation, imagination display of key input or combination thereof, but the disclosure is not limited thereto.

The second screen 120 provides the user to perform various touch behaviors, and then the second screen 120 generates corresponding touch responding to the touch behavior performed by the user. In an embodiment, the second screen 120 includes a touch data capturing module 121 and a transmission controlling module 122. The touch data capturing module 121 is configured to capture corresponding touch data D1 according to the touch behavior of the user, and the transmission controlling module 122 is configured to transmit the touch data D1 captured by the touch data capture module 121 to the processor 130. In an embodiment, the touch data D1 contains at least one of coordinate information or strength information of a touch point. Therefore, when performing subsequent operation, the processor 130 determines the touch position and strength of the user according to the touch data D1 so as to perform corresponding operation.

In some embodiments, the transmission control module 122 transmits the touch data to the processor 130 by various wired or wireless communication interfaces such as an I2C interface, a USB (Universal Serial Bus) interface, a WUSB (Wireless Universal Serial Bus), Bluetooth and the like, but the disclosure is not limited thereto.

Figure 2:
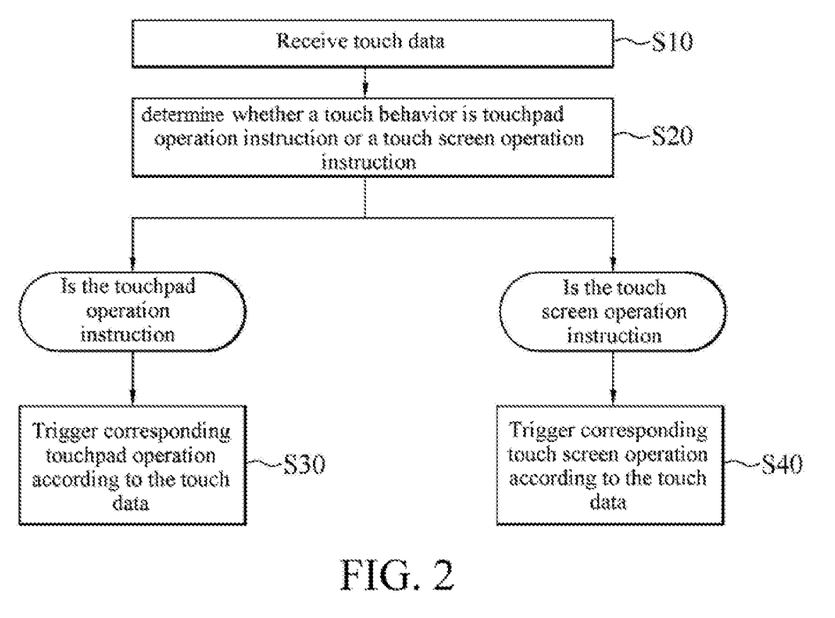
FIG. 2 is a flow schematic diagram of an embodiment of a control method.

Referring to FIG. 1 and FIG. 2, the processor 130 receives the touch data D1 corresponding to the touch behavior of the user (step S10), and determines whether the touch behavior of the user is the touchpad operation instruction or the touch screen operation instruction according to the touch data D1 (step S20). When the processor 130 determines that the touch behavior is the touchpad operation instruction, the processor 130 triggers the corresponding touchpad operation according to the touch data D1 (step S30). When the processor 130 determines that the touch behavior is the touch screen operation instruction, the processor 130 triggers the corresponding touch screen operation according to the touch data D1 (step S40).

In an embodiment of step S10, the processor 130 includes a driver module 131, and the processor 130 receives the touch data D1 by the driver module 131. Moreover, the processor 130 further includes a capture program module 132, and the processor 130 performs input characteristic capture on the touch data D1 by the capture program module 132, for subsequent operation. In some embodiments, the captured input characteristics include input position, package quantity, sliding distance, sliding time, clicking time interval or combination thereof, but the disclosure is not limited thereto. In other embodiment, the input characteristics are any parameters applicable to subsequent determination.

In an embodiment of step S20, the processor 130 further includes a user interface setting module 133 and a determination module 134. In this embodiment, the user interface setting module 133 generates user interface layout information D2 of the second screen 120. Furthermore, the determination module 134 determines whether the touch behavior is the touchpad operation instruction or the touch screen operation instruction according to the user interface layout information D2 and the touch data D1.

In some embodiments, the user interface layout information D2 includes information that are configuration regions divided in the second screen 120, which configuration regions are taken as the virtual touchpad region, which configuration regions are taken as the virtual keyboard region, which configuration regions are taken as the extension display region, or the like. Therefore, the determination module 134 determines whether the touch behavior is the touchpad operation instruction or the touch screen operation instruction according to determining which configuration region is the input position of the touch data D1 located on. In some embodiments, when the input position of the touch data D1 is located on the virtual touchpad region or the virtual keyboard region, the determination module 134 determines that the touch behavior is the touchpad operation instruction. And when the input position of the touch data D1 is located on the extension display region, the determination module 134 determines that the touch behavior is the touch screen operation instruction.

In an embodiment of step S30, the processor 130 further includes a touchpad data processing module 135. When the determination module 134 determines that the touch behavior is the touchpad operation instruction, the determination module 134 directly outputs the touch data D1 or the input characteristics captured from the touch data D1 by the capture program module 132 to the touchpad data processing module 135, and then the touchpad data processing module 135 outputs the touch data D1 or the input characteristics to an operating system OS for performing corresponding touchpad operation. Herein, the touchpad operation performs touch positioning by a relative position.

In some embodiments, when the input position of the touch data D1 is located on the virtual touchpad region, the touchpad operation instruction includes a track operation instruction, a clicking input instruction and the like, but the disclosure is not limited thereto. When the touchpad operation instruction is the track operation instruction, the relationship between the track operation instruction and the corresponding touchpad operation includes: a cursor displayed by the first screen 110 or the second screen 120 is moved when a single-finger sliding instruction taken as the track operation instruction is performed on the virtual touchpad region, or the image displayed on the first screen 110 or the second screen 120 is rolled or zoomed when a double-finger sliding operation taken as the track operation instruction is performed on the virtual touchpad region. When the touchpad operation instruction is the clicking input instruction, the relationship between the clicking input instruction and the corresponding touch operation includes: when a single click input instruction or double click input instruction taken as the clicking input instruction is performed on the touchpad operation region, the application program displayed on the first screen 110 or the second screen 120 is clicked. When the input position of the touch data D1 is located on the virtual keyboard region, the relationship between the touchpad operation instruction and the corresponding touchpad operation includes: the first screen 110 or the second screen 120 is triggered to display corresponding characters or key functions when the touchpad operation instruction is performed on the virtual keyboard region.

In some embodiments, the operating system OS executes touchpad operation by corresponding inbox driver such as Windows precision touchpad driver.

In an embodiment of step S40, the processor 130 also includes a touch screen data processing module 136, and after the determination module 134 determines that the touch behavior is the touch screen operation instruction, the determination module 134 directly outputs the touch data D1 or the input characteristics captured from the touch data D1 by the capture program module 132 to the touch screen data processing module 136, and then the touch screen data processing module 136 outputs the touch data D1 or the input characteristics to the operating system OS to perform corresponding touch screen operation. Herein, the touch screen operation performs touch positioning by an absolute position.

In some embodiments, the relationship between the touch screen operation instruction and the corresponding touch screen operation includes: the application program displayed on the first screen 110 or the second screen 120 is clicked when a single click operation instruction or a double click operation instruction taken as the touch screen operation instruction is performed, the interface displayed on the first screen 110 or the second screen 120 is slid when a sliding operation instruction is performed, or the image displayed on the first screen 110 or the second screen 120 is zoomed when a zooming operation instruction is performed, but the disclosure is not limited thereto.

Figure 3:
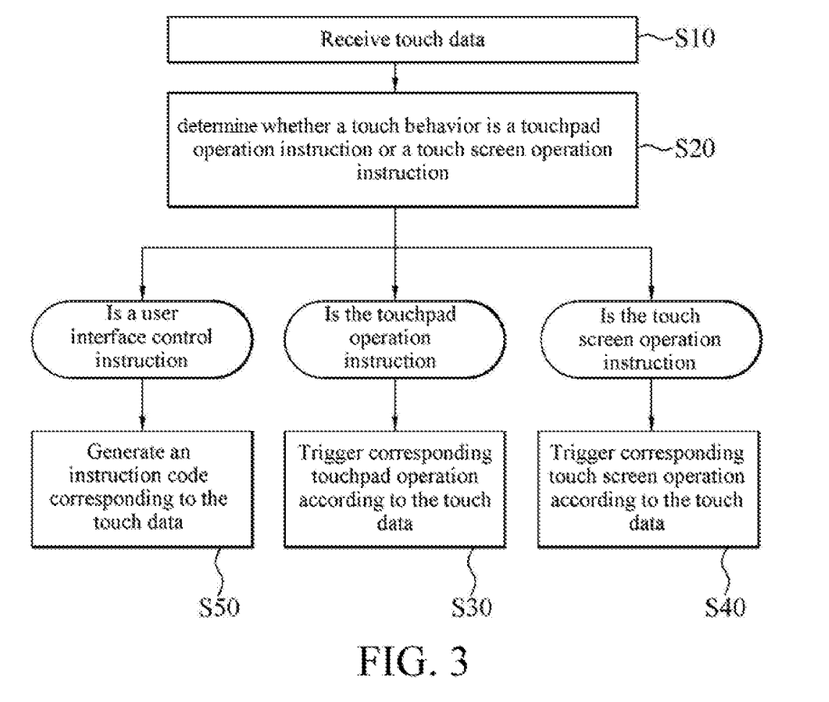
FIG. 3 is a flow schematic diagram of another embodiment of the control method.

FIG. 3 is a flow schematic diagram of an embodiment of the control method. Referring to FIG. 1 to FIG. 3, in step S20, the processor 130 also includes a control module 137. Furthermore, besides determining whether the touch behavior is the touchpad operation instruction or the touch screen operation instruction according to the user interface layout information D2 and the touch data D1, the determination module 134 also determines whether the touch behavior is the user interface control instruction according to the user interface layout information D2 and the touch data D1. When the determination module 134 determines that the touch behavior is the user interface control instruction, the determination module 134 generates and outputs an instruction code Cmd corresponding to the touch data D1 to the control module 137, so that the control module 137 executes corresponding control operation according to the control code Cmd (step S50).

In an embodiment of step S50, when the control module 137 determines that the instruction code Cmd received from the determination module 134 is configured to control a certain application program App displayed in a first image I1 of the first screen 110, the control module 137 controls a corresponding application program APP.

In some embodiments, if the user is about to perform gesture operation of an application program APP while the application program APP is in execution, the application program APP applies for performing gesture operation and the control module 137 generates corresponding gesture data D3 to the touchpad data processing module 135, so as to trigger corresponding gesture operation by the touchpad data processing module 135. In an embodiment, the gesture operation is a double-finger gesture to zoom an object, but the disclosure is not limited thereto.

In another embodiment of step S50, the processor 130 further includes a graphic processing module 138. When the control module 137 determines that the instruction code Cmd received from the determination module 134 is configured to adjust the user interface configuration of the second screen 120, the control module 137 generates interface setting data D4, and outputs interface setting data D4 respectively to the graphic processing module 138 and the user interface setting module 133. The graphic processing module 138 updates the user interface configuration of the second screen 120 according to the interface setting data D4. The user interface setting module 133 generates new user interface layout information D2 according to the interface setting data D4 and outputs the interface setting data D4 to the determination module 134, so that the determination module 134 acknowledges that the current user interface configuration condition on the second screen 120.

In another embodiment of step S50, when the control module 137 determines that the instruction code Cmd received from the determination module 134 is configured to control an application program APP displayed in the first image I1 of the first screen 110 and adjust the user interface configuration of the second screen 120, the control module 137 controls the application program APP and generates corresponding interface setting data D4.

In some embodiments, the graphic processing module 138 is a graphics processing unit (GPU).

In some embodiments, the driver module 131, the capture program module 132, the user interface setting module 133, the determination module 134, the touch data processing module 135 and the touch key data processing module 136 are included in the same processing driver module U1. In an embodiment, the control module 137 is a computer-controlled application program.

Figure 5:
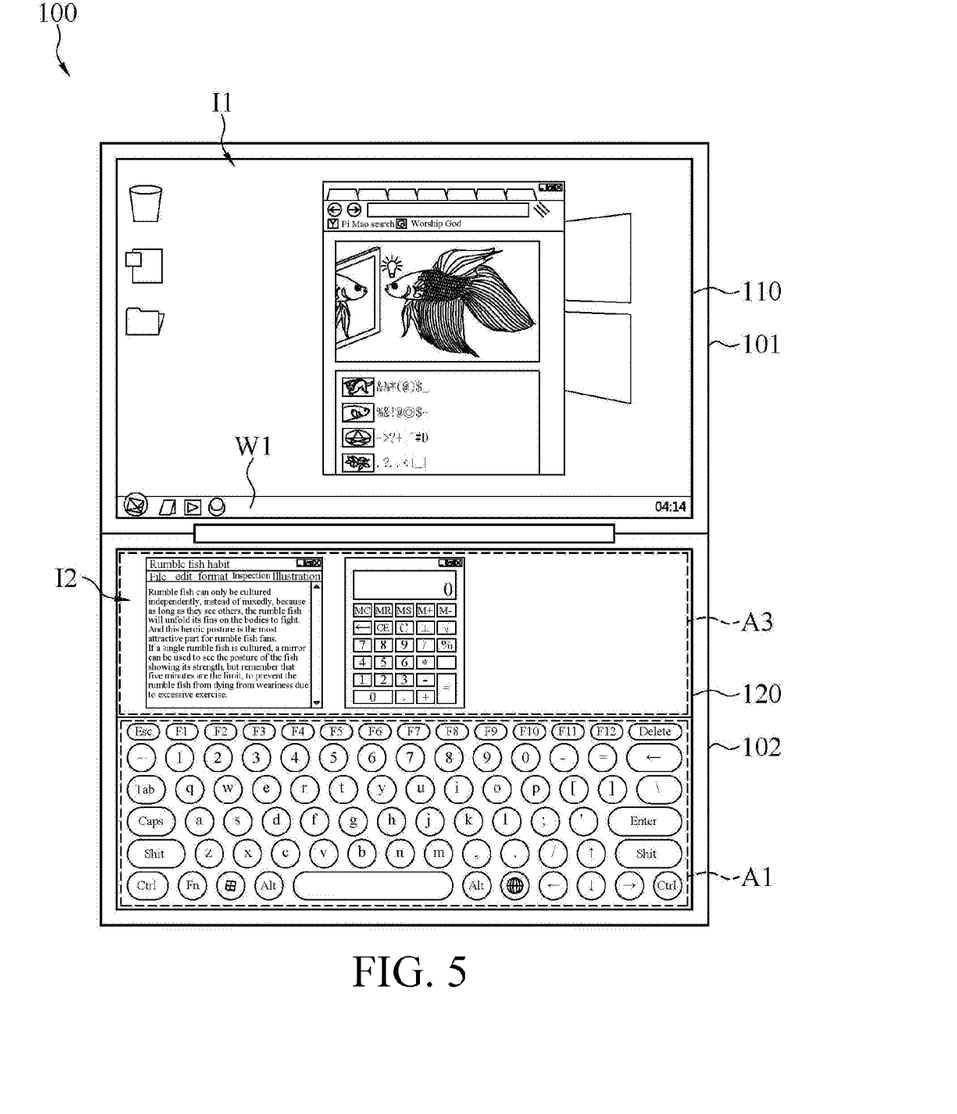
FIG. 5 is a general schematic diagram of an embodiment when the electronic device is operated in a notebook computer multitask mode.

Referring to FIG. 4 and FIG. 5, in some embodiments, user interface configuration of the second screen 120 is varied according to different application modes of the electronic device 100. In some embodiments, the user interface configuration of the second screen 120 includes a virtual keyboard region A1, a virtual touchpad region A2, an extension display region A3 or the combination thereof. A keyboard image with multiple keys is displayed on the virtual keyboard region A1, so that the user knows that each touch position in the virtual keyboard region A1 is corresponding to which symbols or functions. An image representing a touchpad is displayed on the virtual touchpad region A2 for users to perform the touchpad operation on the virtual touchpad region A2. In an embodiment, the extension display region A3 is taken as an extension display screen of the first screen 110.

Referring to FIG. 1 to FIG. 5, in some embodiments, the processor 130 further includes a virtual display module 139. The virtual display module 139 is configured to generate a second image I2. When the user interface configuration of the second screen 120 includes an extension display region A3, the graphic processing module 138 outputs the second image I2 received from the virtual display module 139 to the extension display region A3 to display.

In some embodiments, the virtual display module 139 includes a virtual display driver module 1391 and a virtual screen 1392. The virtual display driver module 1391 is configured to generate the second image I2 and the virtual screen 1392, so that the operating system OS determines that the virtual screen 1392 is a real screen.

In some embodiments, the application mode of the electronic device 100 includes a general notebook computer mode, a notebook computer multiplex mode, a panorama mode, a panorama multiplex mode and a book mode, but the disclosure is not limited thereto.

Referring to FIG. 1 to FIG. 4, in this embodiment, when the application mode is the general notebook computer mode, the user interface configuration of the second screen 120 of the electronic device 100 includes a virtual keyboard region A1 and a virtual touchpad region A2. In the general notebook computer mode, when the user touches a key displayed on the virtual keyboard region A1, the electronic device 100 outputs characters or key functions corresponding to the key on the first screen 110. In addition, at least one of the cursor displayed in the first screen 110, the application program, the rolling function or the zooming function is controlled by performing operations such as clicking, sliding or the like on the virtual touchpad region A2.

In the general notebook computer mode, the determination module 134 of the electronic device 100 determines whether the touch behavior is the user interface control instruction according to the touch data D1 in step S20. When the determination module 134 determines that the touch behavior is the user interface control instruction, step S50 is executed. And when the determination module 134 determines that the touch behavior is not the user interface control instruction, the determination module 134 determines whether the touch behavior is the touchpad operation instruction or the touch screen operation instruction according to the user interface layout information D2 and the touch data D1, and then selects to execute step S30 or step S40 according to a determination result. Referring to FIG. 4, in this embodiment, the user interface configuration of the second screen 120 includes the virtual keyboard region A1 and the virtual touchpad region A2. In step S20, the determination module 134 determines that the touch behavior performed on the virtual keyboard region A1 or the virtual touchpad region A2 is the touchpad operation instruction, and therefore the determination module 134 selects to execute step S30. In step S30, the corresponding touchpad operation is triggered according to the input position of the touch data D1 is located on the virtual touchpad region or the virtual keyboard region.

In some embodiments, in the general notebook computer mode, the virtual keyboard region A1 is located on the upper part of the second screen 120, and the virtual touchpad region A2 is located on the lower part of the second screen 120, but the disclosure is not limited thereto. In one embodiment, the positions of the virtual keyboard region A1 and the virtual touchpad region A2 on the second screen 120 are exchanged by an interface adjustment setting. In addition, in other embodiment, the proportion of the virtual keyboard region A1 of the second screen 120 and the proportion of the virtual touchpad region A2 of the second screen 120 are adjusted by the interface adjustment setting. Furthermore, in the general notebook computer mode, the graphic processing module 138 outputs image data of the virtual keyboard region A1 and the virtual touchpad region A2 to the second screen 120 by a direct mode.

FIG. 5 is a general schematic diagram of an embodiment when the electronic device is operated in a notebook computer multitask mode. Referring to FIG. 1 to FIG. 5, in an embodiment of the notebook computer multiplex mode, the user interface configuration of the second screen 120 of the electronic device 100 includes the virtual keyboard region A1 and the extension display region A3. In other embodiment, the user interface configuration of the second screen 120 of the electronic device 100 includes the virtual touchpad region A2 and the extension display region A3. In this embodiment, the extension display region A3 is located on the upper part of the second screen 120, and the virtual keyboard region A1 is located on the lower part of the second screen 120. In this case, the extension display region A3 on the upper part of the second screen 120 is taken as an extension screen of the first screen 110. In other embodiment, the different works are executed on the first screen 110 and the extension regions A3 of the second screen 120 at the same time. Moreover, the proportion of the extension display region A3 of the second screen 120 and the proportion of the virtual keyboard region A1 of the second screen 120 are adjusted by the interface adjustment setting.

In the notebook computer multiplex mode, the determination module 134 of the electronic device 100 determines whether the touch behavior is the user interface control instruction according to the touch data D1 in step S20. When the determination module 134 determines that the touch behavior is the user interface control instruction, step S50 is executed. When the determination module 134 determines that the touch behavior is not the user interface control instruction, the determination module 134 determines whether the touch behavior is the touchpad operation instruction or the touch screen operation instruction according to the user interface layout information D2 and the touch data D1, for selecting to execute step S30 or step S40.

Referring to FIG. 5, in this embodiment, the user interface configuration of the second screen 120 of the electronic device 100 includes the virtual keyboard region A1 and the extension display region A3. In step S20, the determination module 134 determines that the touch behavior performed on the virtual keyboard region A1 is the touchpad operation instruction, and selects to execute step S30 according to the determination result. The determination module 134 determines that the touch behavior performed on the extension display region A3 is the touch screen operation instruction, and selects to execute step S40 according to the determination result.

In an embodiment, in the notebook computer multiplex mode, the graphic processing module 138 of the electronic device 100 integrates and outputs the second image 12 which will be displayed on the extension display region A3 and a keyboard image which will be displayed on the virtual keyboard region A1 to the second screen 120 to display.

Figure 6:
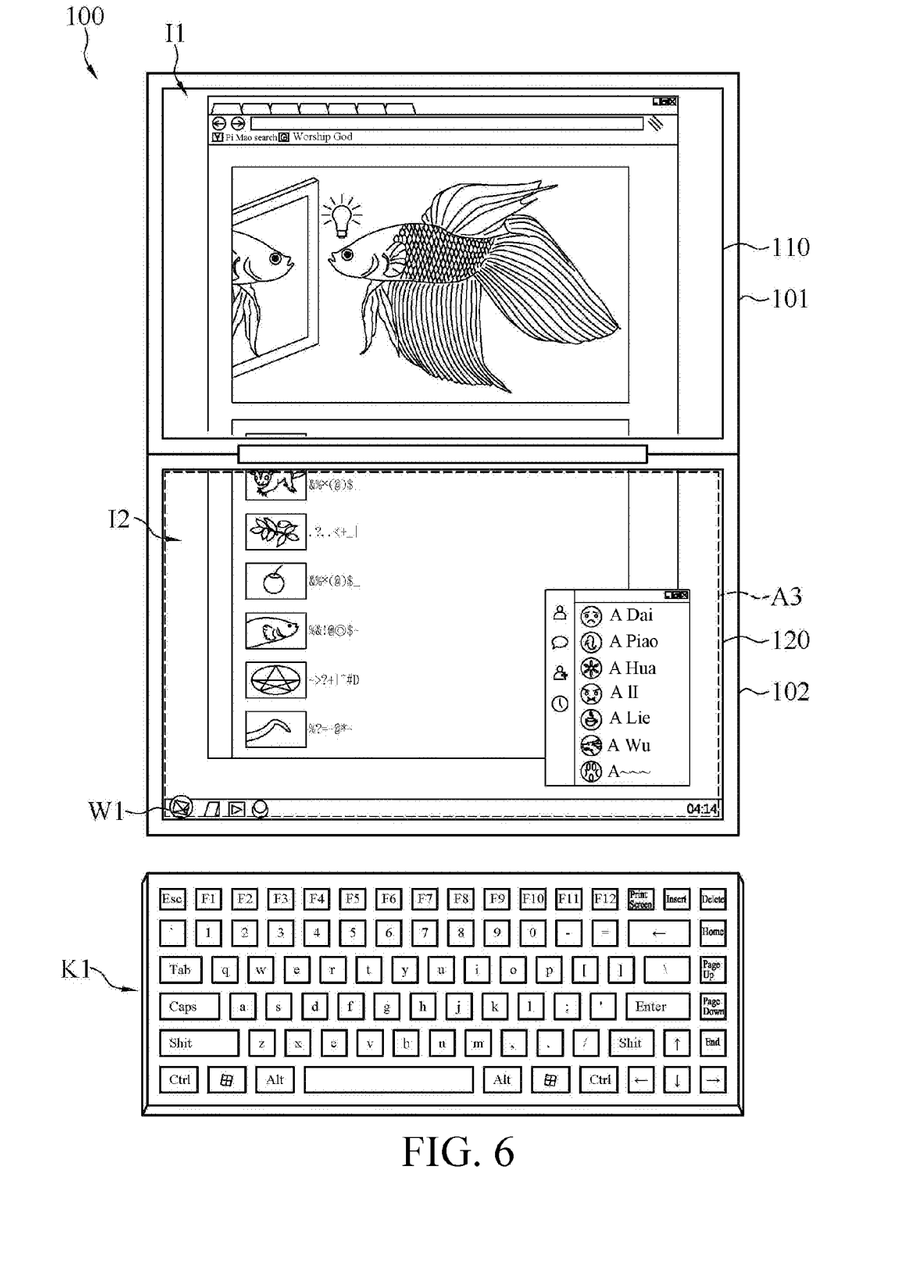
FIG. 6 is a general schematic diagram of an embodiment when the electronic device is operated in a panorama mode.

FIG. 6 is a general schematic diagram of an embodiment when the electronic device is operated in a panorama mode. Referring to FIG. 1 to FIG. 6, in an embodiment of the panorama mode, the user interface configuration of the second screen 120 of the electronic device 100 includes the extension display region A3. In this embodiment, the entire second screen 120 is taken as an extension screen of the first screen 110. Furthermore, the first screen 110 and the second screen 120 jointly display a single expanded image. Herein, the system taskbar W1 is displayed on the second screen 120. In the panorama mode, when the determination module 134 of the electronic device 100 directly determines that the touch behavior is the touch screen operation instruction in the step S20, step S40 is selected to execute. In an embodiment, the keyboard input is executed by an external keyboard K1.

Figure 7:
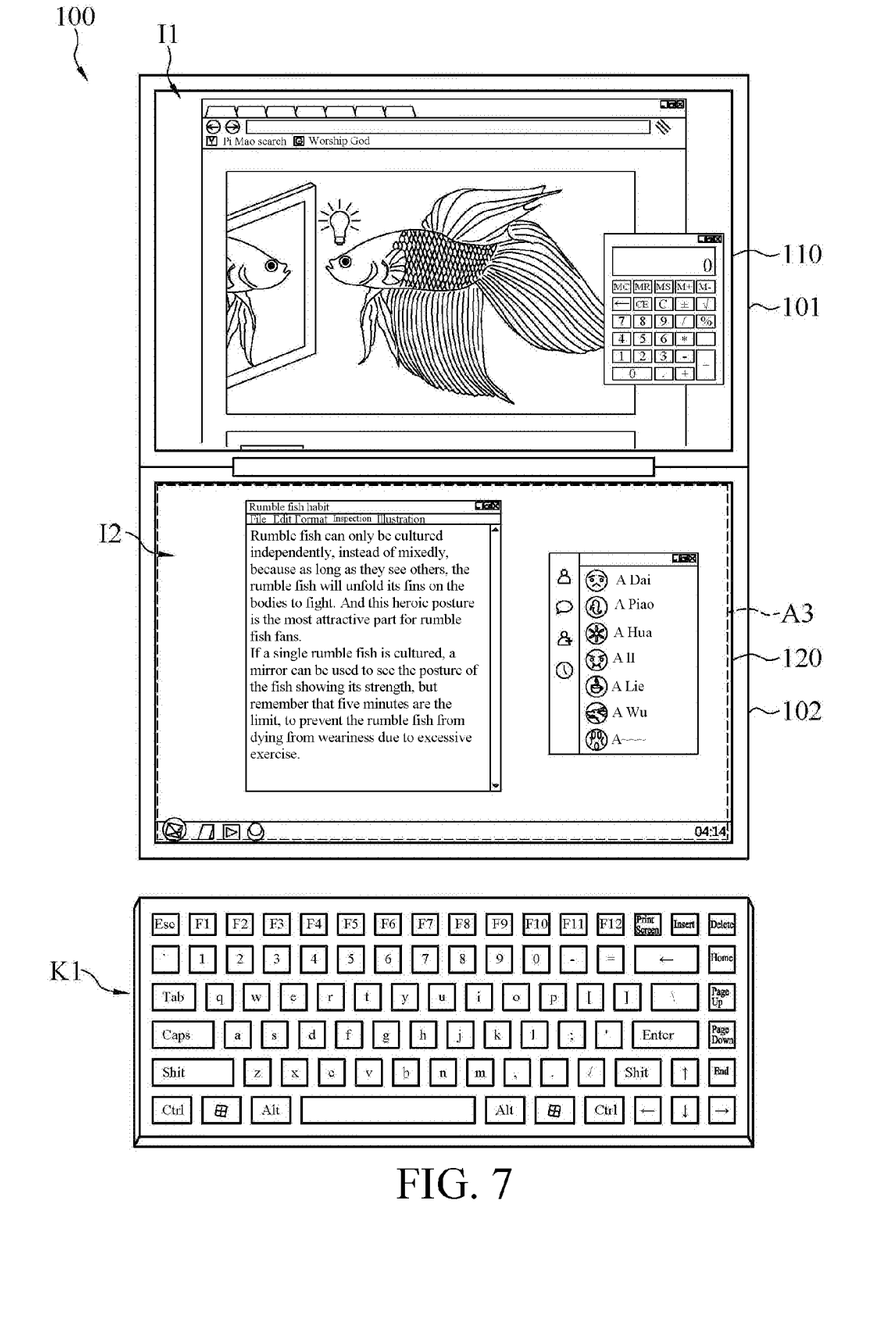
FIG. 7 is a general schematic diagram of an embodiment when the electronic device is operated in a panorama multitask mode.

FIG. 7 is a general schematic diagram of an embodiment when the electronic device is operated in a panorama multitask mode. Referring to FIG. 1 to FIG. 7, in an embodiment of the panorama multitask mode, the user interface configuration of the second screen 120 of the electronic device 100 is similar to the user interface configuration in the panorama mode. In this embodiment, different works (or, applications) are executed on the first screen 110 and the second screen 120 simultaneously, so that the user views the different works at the same time. When the determination module 134 of the electronic device 100 directly determines that the touch behavior is the touch screen operation instruction in step S20, step S40 is selected to execute. In an embodiment, the keyboard input is executed by an external keyboard K1.

Figure 8:
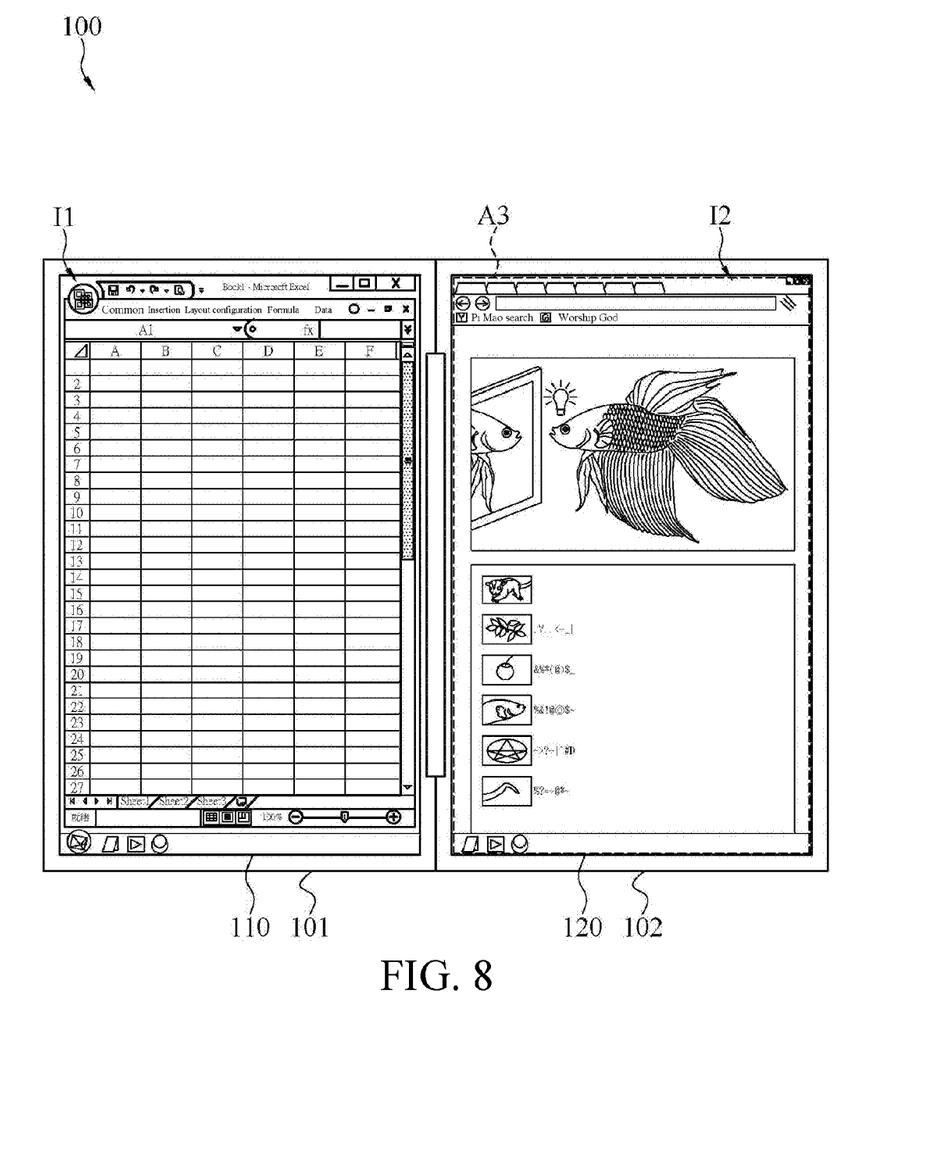
FIG. 8 is a general schematic diagram of an embodiment when the electronic device is operated in a book mode.

FIG. 8 is a general schematic diagram of an embodiment when the electronic device is operated in a book mode. Referring to FIG. 1 to FIG. 8, in an embodiment of the book mode, the user interface configuration of the second screen 120 of the electronic device 100 is similar to the user interface configuration in the panorama multitask mode. In one embodiment, when the application mode is in the book mode and the electronic device 100 is horizontally rotated by 90 degrees, the images displayed on the first screen 110 and the second screen 120 are correspondingly adjusted according to the rotated direction of the electronic device 100. Herein, FIG. 8 is drawn in an embodiment that the electronic device 100 is rotated leftwards by 90 degrees as an example, but the disclosure is not limited thereto. In the book mode, when the determination module 134 of the electronic device 100 directly determines that the touch behavior is the touch screen operation instruction in the step S20, step S40 is selected to execute. In an embodiment, the keyboard input is executed by an external keyboard K1.

In some embodiments, the control method in the disclosure is realized by a non-transitory computer readable recording medium device. The non-transitory computer readable recording medium device stores at least one program. After the program command is loaded on an electronic device, the electronic device performs the control method of any of the above-mentioned control methods. In an embodiment, the non-transitory computer readable recording medium device is a memory in the electronic device 100. In some embodiments, the memory is achieved by one or more storage elements, and the storage elements are, but not limited to, non-volatile memories, including ROM (Read-Only Memories) or flash memories, or volatile memories, including RAM (random access memories). In another embodiment, the non-transitory computer readable recording medium device is a remote storage element, and transmits to the electronic device 100 in a wired or wireless manner. In further another embodiment, the non-transitory computer readable recording medium device is a memory outside the electronic device 100, and the program code of the storage element is connected and accessed by a reader or a connector of the electronic device 100.

In some embodiments, the processor 130 is achieved by using a SoC wafer, a CPU (Central Processing Unit), a MCU (Microcontroller) or an ASIC (Application-Specific Integrated Circuit) and the like. Moreover, at least one of the first screen 110 or the second screen 120 is a capacitive touch display screen, a resistive touch display screen or other touch display screens made by using proper touch sensing elements.

To sum up, the control method, the electronic device and the non-transitory computer readable recording medium device according to the embodiments of the disclosure determine whether the touch behavior is the touchpad operation instruction or the touch screen operation instruction according to the touch data by the determination module and then execute the corresponding touchpad operation or touch screen operation by the operating system. Thus, the transmission flow of the touch data is simplified and the transmission efficiency is improved. According to the disclosure, only one operating system is needed to realize intercommunication between two screens.

The above-described embodiments and/or implementations are merely illustrative of preferred embodiments and/or implementations for practicing the techniques of the invention, and are not intended to limit the embodiments of the techniques of the invention in any manner, and any person skilled in the art may make various variations or modifications to obtain other equivalent embodiments without departing from the scope of the technical means disclosed herein, and all such embodiments should still be considered to be substantially the same techniques or embodiments as the disclosure.

What is claimed is:

1. A control method, applied to an electronic device with a first screen and a second screen, and the control method comprises:

receiving touch data responding to a touch behavior generated by the second screen;

receiving user interface layout information of the second screen and determining whether the touch behavior corresponds to a user interface control instruction, a touchpad operation instruction or a touch screen operation instruction according to the user interface layout information and the touch data; and wherein responsive to receiving the touch data and the user interface layout information indicating that a user interface configuration of the second screen includes a virtual inputting-tool region and an extension display region, performing the steps of:

determining whether the touch behavior corresponds to the user interface control instruction according to the touch data;

wherein the virtual inputting-tool region is a virtual keyboard region, a virtual touchpad region or the combination thereof;

responsive to determining that the touch behavior corresponds to the user interface control instruction, generating an instruction code corresponding to the touch behavior, determining if the instruction code is an instruction code configured to control an application program displayed in the first image of the first screen or an instruction code configured to adjust the user interface configuration of the second screen, wherein responsive to the instruction code being an instruction code configured to control an application program displayed in the first image of the first screen, controlling the application program, responsive to the instruction code being an instruction code configured to adjust the user interface configuration of the second screen, adjusting the user interface configuration of the second screen and updates the user interface layout information;

determining an application mode of the electronic device, where the application mode comprises one of: a notebook computer multiplex mode or a panorama mode;

wherein when the instruction code is configured to adjust the user interface configuration of the second screen in the notebook computer multiplex mode, the processor displays the virtual keyboard region;

wherein when the instruction code is configured to adjust the user interface configuration of the second screen in the panorama mode, the processor stops displaying the virtual keyboard region;

responsive to determining that the touch behavior does not correspond to the user interface control instruction, further determining whether the touch behavior corresponds to the touchpad operation instruction or the touch screen operation instruction according to the touch data and the user interface layout information, wherein the user interface layout information specifies configuration regions divided in the second screen, wherein the user interface layout information further specifies which configuration regions are taken as the virtual touchpad region, which configuration regions are taken as the virtual keyboard region, and which configuration regions are taken as the extension display region, determining whether the touch behavior is a touchpad operation or a touch screen operation through determining which configuration region an input position of the touch data is, wherein when the input position of the touch data is located on the virtual inputting-tool region, determining that the touch behavior corresponds to the touchpad operation instruction, and when the input position of the touch data is located on the extension display region, determining that the touch behavior corresponds to the touch screen operation instruction;

responsive to determining that the touch behavior corresponds to the touchpad operation instruction, triggering a corresponding touchpad operation on the first screen or the second screen, wherein the touchpad operation performs touch positioning by a relative position; and responsive to determining that the touch behavior corresponds to the touch screen operation instruction, triggering a corresponding touch screen operation on the second screen, wherein the touch screen operation performs touch positioning by an absolute position.

2. The control method according to claim 1, wherein the first screen is configured to display a first image, and the control method further comprises the steps of:

generating a second image by a virtual display module; and outputting the second image to the extension display region of the user interface configuration when the user interface configuration comprises the extension display region.

3. The control method according to claim 1, further comprising the step of:

outputting gesture data to a touchpad data processing module when the application program applies for a gesture operation.

4. The control method according to claim 1, wherein the touchpad operation comprises one or more of: movement of a cursor, a rolling operation, a zooming operation, and a clicking input operation.

5. The control method according to claim 1, wherein the step of triggering the corresponding touchpad operation on the first screen or the second screen comprises: outputting the touch data to a touchpad data processing module to trigger the corresponding touchpad operation.

6. The control method according to claim 1, wherein the step of triggering the corresponding touch screen operation on the second screen comprises: outputting the touch data to a touch screen data processing module to trigger the corresponding touch screen operation.

7. An electronic device, comprising:
a first screen, configured to display a first image;
a second screen, configured to generate touch data responding to a touch behavior; and
a processor, configured to receive the touch data and a user interface layout information of the second screen, and to determine whether the touch behavior corresponds to a user interface control instruction, a touchpad operation instruction or a touch screen operation instruction according to the user interface layout information and the touch data; and wherein when the processor receives the touch data and the user interface layout information indicates that a user interface configuration of the second screen includes a virtual inputting-tool region and an extension display region:

the processor determines whether the touch behavior corresponds to the user interface control instruction according to the touch data, wherein the virtual inputting-tool region is a virtual keyboard region, a virtual touchpad region or the combination thereof;

when the processor determines that the touch behavior corresponds to the user interface control instruction, the processor generates an instruction code corresponding to the touch behavior, and the processor determines if the instruction code is an instruction code configured to control an application program displayed in the first image of the first screen or an instruction code configured to adjust the user interface configuration of the second screen, wherein when the instruction code is an instruction code configured to control an application program displayed in the first image of the first screen, the processor controls the application program, when the instruction code is an instruction code configured to adjust the user interface configuration of the second screen, the processor adjusts the user interface configuration of the second screen and updates the user interface layout information; and wherein the processor determines an application mode of the electronic device, where the application mode comprises one of: a notebook computer multiplex mode or a panorama mode;

wherein when the instruction code is configured to adjust the user interface configuration of the second screen in the notebook computer multiplex mode, the processor displays the virtual keyboard region;

wherein when the instruction code is configured to adjust the user interface configuration of the second screen in the panorama mode, the processor stops displaying the virtual keyboard region;

when the processor determines that the touch behavior does not correspond to the user interface control instruction, the processor further determines whether the touch behavior corresponds to the touchpad operation instruction or the touch screen operation instruction according to the touch data and the user interface layout information, wherein the user interface layout information specifies configuration regions divided in the second screen, wherein the user interface layout information further specifies which configuration regions are taken as the virtual touchpad region, which configuration regions are taken as the virtual keyboard region, and which configuration regions are taken as the extension display region, the processor determines whether the touch behavior is a touchpad operation or a touch screen operation through determining which configuration region an input position of the touch data is, wherein when the input position of the touch data is located on the virtual inputting-tool region, the processor determines that the touch behavior corresponds to the touchpad operation instruction, and when the input position of the touch data is located on the extension display region, the processor determines that the touch behavior corresponds to the touch screen operation instruction;

when the processor determines that the touch behavior corresponds to the touchpad operation instruction, the processor triggers a corresponding touchpad operation on the first screen or the second screen, wherein the touchpad operation performs touch positioning by a relative position; and when the processor determines that the touch behavior corresponds to the touch screen operation instruction, the processor triggers a corresponding touch screen operation on the second screen, wherein the touch screen operation performs touch positioning by an absolute position.

8. The electronic device according to claim 7, wherein the processor outputs the instruction code to a control module of the processor when the touch behavior is the user interface control instruction, the processor outputs the touch data to a touchpad data processing module of the processor when the touch behavior is the touchpad operation instruction, and the processor outputs the touch data to a touch screen data processing module of the processor when the touch behavior is the touch screen operation instruction.

9. The electronic device according to claim 8, wherein the control module controls the application program when the control module determines that the instruction code is configured to control the application program displayed in the first image of the first screen.

10. The electronic device according to claim 9, wherein the control module outputs gesture data to the touchpad data processing module when the application program applies for a gesture operation.

11. The electronic device according to claim 7, wherein the processor further comprises a graphic processing module, the graphic processing module updates the user interface configuration of the second screen according to an interface setting data, and the processor updates the user interface layout information according to the interface setting data.

12. The electronic device according to claim 11, wherein the processor further comprises a virtual display module, the virtual display module generates a second image, and the graphic processing module outputs the second image to the extension display region of the user interface configuration when the user interface configuration of the second screen comprises the extension display region.

13. A non-transitory computer readable recording medium device, configured to store a program command, and after the program command is loaded on an electronic device with a first screen and a second screen, the electronic device performs steps of:

receiving touch data responding to a touch behavior generated by the second screen;

receiving user interface layout information of the second screen and determining whether the touch behavior corresponds to a user interface control instruction, a touchpad operation instruction or a touch screen operation instruction according to the user interface layout information and the touch data; and wherein responsive to receiving the touch data and the user interface layout information indicating that a user interface configuration of the second screen includes a virtual inputting-tool region and an extension display region, performing the steps of:

determining whether the touch behavior corresponds to the user interface control instruction according to the touch data;

wherein the virtual inputting-tool region is a virtual keyboard region, a virtual touchpad region or the combination thereof;

responsive to determining that the touch behavior corresponds to the user interface control instruction, generating an instruction code corresponding to the touch behavior, determining if the instruction code is an instruction code configured to control an application program displayed in the first image of the first screen or an instruction code configured to adjust the user interface configuration of the second screen, wherein responsive to the instruction code being an instruction code configured to control an application program displayed in the first image of the first screen, controlling the application program, responsive to the instruction code being an instruction code configured to adjust the user interface configuration of the second screen, adjusting the user interface configuration of the second screen and updates the user interface layout information; and determining an application mode of the electronic device, where the application mode comprises one of: a notebook computer multiplex mode or a panorama mode;

wherein when the instruction code is configured to adjust the user interface configuration of the second screen in the notebook computer multiplex mode, the processor displays the virtual keyboard region;

wherein when the instruction code is configured to adjust the user interface configuration of the second screen in the panorama mode, the processor stops displaying the virtual keyboard region;

responsive to determining that the touch behavior does not correspond to the user interface control instruction, further determining whether the touch behavior corresponds to the touchpad operation instruction or the touch screen operation instruction according to the touch data and the user interface layout information, wherein the user interface layout information specifies configuration regions divided in the second screen, wherein the user interface layout information further specifies which configuration regions are taken as the virtual touchpad region, which configuration regions are taken as the virtual keyboard region, and which configuration regions are taken as the extension display region, determining whether the touch behavior is a touchpad operation or a touch screen operation through determining which configuration region an input position of the touch data is, wherein when an input position of the touch data is located on the virtual inputting-tool region, determining that the touch behavior corresponds to the touchpad operation instruction, and when the input position of the touch data is located on the extension display region, determining that the touch behavior corresponds to the touch screen operation instruction;

responsive to determining that the touch behavior corresponds to the touchpad operation instruction, triggering a corresponding touchpad operation on the first screen or the second screen, wherein the touchpad operation performs touch positioning by a relative position; and responsive to determining that the touch behavior corresponds to the touch screen operation instruction, triggering a corresponding touch screen operation on the second screen, wherein the touch screen operation performs touch positioning by an absolute position.

\* \* \* \* \*